UNITED STATES PATENT OFFICE.

LOUIS HAMBROCK, JR., OF NEWARK, NEW JERSEY.

FINISH-REMOVER.

1,143,387. Specification of Letters Patent. Patented June 15, 1915.

No Drawing. Application filed July 2, 1914. Serial No. 848,542.

*To all whom it may concern:*

Be it known that I, LOUIS HAMBROCK, Jr., a citizen of the United States, and a resident of Newark, county of Essex, and State of New Jersey, have invented certain new and useful Improvements in Finish-Removers, of which the following is a specification.

This invention relates to a composition of matter for the removing of varnish, paint or like finish from surfaces to which it has been applied, such composition comprising ingredients which will soften or dissolve the finish, and ingredients which will retard the evaporation of the solvent or solvents.

The present invention relates more particularly to the retarding agent which is usable as well in other connections as in removers.

In making a remover according to the present invention I make use of polymerized oil such as tung oil (Chinese wood oil) for the preparation of the retarding agent. Heretofore, so far as I am aware, such polymerized oils have not been available in such condition as to be soluble in the usual solvents made use of in finish removers. The use of polymerized oils for retarders for removers has been proposed, but such use of polymerized oils has hitherto been impracticable because of the fact that being insoluble or substantially insoluble in such usual solvents, they have not heretofore given a uniform paste in which they remain in solution or in perfect suspension, but instead they settle out. A retarder made in accordance with my invention is soluble in the usual finish remover solvents and so does not have these objectionable qualities. Its components remain in solution or in perfect suspension and do not settle out. Furthermore, there is no necessity of subjecting my retarding material to grinding or to other treatment for obtaining it in finely divided state as heretofore.

According to this invention tung oil, or other oil having equivalent properties, is brought to the point of polymerization in the presence of a solid or solids and is treated at the necessary high temperature with a high boiling solvent which has the effect of bringing such material so treated into solution in such manner that it will remain permanently in solution in the usual solvents in the finish remover. The solids which I use, such as copal and waxes, are beneficial in many ways. Among other things, they serve to assist in the controlling of polymerization, promote the solubility of the polymerized oil, and add to the effectiveness of the retarding agent in the finished remover.

The high boiling solvents to which I refer are found in the distillate obtained from the fusion of copals, and I shall speak of such substances as copal oils. They have a boiling point above 200° C., and allow safe working in adding them to the hot polymerized tung oil-solids compound.

The copal oils may be obtained by distillation of copal gums, such as Congo or black damar. For example, if 100 pounds of copal, preferably Congo copal, be fused in a still and the first fifteen (15) pounds of distillate collected, the distillate obtained consists of water and copal oils in the form of a semi-emulsion. This material may be dehydrated in any convenient manner. For example, if anhydrous calcium chlorid is added to the emulsion-like mass and permitted to stand for a time, the copal oils will be separated free from water and can be decanted, ready for use.

Having obtained the copal oil substantially as described, to make the retarder for the remover a material solid at ordinary temperatures, and preferably a copal, such as Manila or other copal, is brought to the point of complete fusion and a solution of wax, such as beeswax or ceresin or other animal or plant wax, or equivalent waxy material in tung oil, or other oil having equivalent properties, is added thereto, and the whole mass brought to the point of polymerization by heating to about 280° C. and holding at that temperature until polymerization has taken place. This can be tested by means of a steel rod dipped in the material. The liquid is permitted to drip from the end of the rod after being withdrawn, and when the liquid, dripping from the rod, solidifies before it drops off, this serves to indicate that polymerization has been accomplished. The copal oils are then added and the polymerized composition together with the copal oils forms a homogeneous mass of a pasty consistency and which is so completely soluble in ordinary solvents, such as benzol, etc., as are commonly employed in finish removers as not to settle out of solutions made therewith.

An illustrative example of procedure in accordance with my invention is as follows: Six (6) pounds of material solid at usual temperatures, as Manila or other copal, is brought to the point of fusion and a solution of waxy material, such as described, in tung oil, comprising four (4) pounds of the wax dissolved in four (4) pounds of tung oil, is added thereto and the temperature kept at around 280° C. until polymerization is accomplished, which can be tested in the manner stated. After polymerization has taken place eight (8) pounds of the copal oils, obtained as described, are added thereto, thus effecting the solution of the polymerized composition in the solvent copal oils, and the composite mass so formed, when cool, forms a pasty material in condition to be dissolved by the ordinary finish solvents used in removers.

In making a remover I may take three (3) parts of the pasty mass, obtained as above, five (5) parts benzol and eight (8) parts methyl alcohol, although these proportions are merely illustrative and may be varied as is ordinary practice with finish removers. Where benzol and alcohol are used the benzol is preferably added first to the pasty mass obtained by the action of copal oils, as already explained, and last the alcohol. Preferably these materials are added in such proportions as to make a semi-pasty material which may be used as a remover upon vertical or inclined walls or ceilings, and in which the retarding agent comprising polymerized tung oil, as described, remains permanently in solution or in perfect suspension and does not settle out as heretofore.

When the remover made up as described is applied to finish, a tough, elastic, impervious film is formed thereon which is highly effective in retarding evaporation of the finish solvents.

It is to be understood that the examples hereinbefore given are for the purpose of illustration only, that my invention is as broad as my claims, and that the same may be used for other purposes than as specifically set forth herein, and that other changes may be made from the precise disclosure hereof, within the scope of my claims, without departing from my invention or sacrificing any of its advantages.

Having now described my invention, I claim:

1. A retarder for finish removers comprising copal, wax, polymerized oil and copal oils, said retarder being soluble in finish solvents.

2. A finish remover containing a finish solvent or solvents, and an evaporation retarder comprising copal, wax, polymerized tung oil and copal oils soluble in the finish solvent or solvents.

3. A composition of matter comprising copal, a waxy body, polymerized tung oil and copal oils and soluble in benzol and like solvents.

4. The process of polymerizing tung oil by application of heat and rendering same soluble by the addition of copal oils thereto so that same may be dissolved in benzol and like solvents.

5. The process of polymerizing tung oil by heat in the presence of a solvent fusible at the heat of polymerization, and adding copal oils thereto and thereby obtaining a material containing polymerized tung oil soluble in benzol and like solvents.

6. The process of polymerizing tung oil by application of heat at about 280° C. in the presence of copal and a waxy body and adding copal oils to the composite polymerized product so obtained, thereby producing a material soluble in benzol and like solvents.

In testimony that I claim the foregoing, I have hereunto set my hand, this 1st day of July, 1914.

LOUIS HAMBROCK, Jr.

Witnesses:
C. J. Fess,
M. A. Johnson.